United States Patent
Guo

(10) Patent No.: US 7,615,982 B1
(45) Date of Patent: Nov. 10, 2009

(54) POWER CONVERTER ABLE TO RAPIDLY RESPOND TO FAST CHANGES IN LOAD CURRENT

(75) Inventor: Yigang Guo, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 171 days.

(21) Appl. No.: 11/493,125

(22) Filed: Jul. 26, 2006

(51) Int. Cl.
*G05F 1/00* (2006.01)

(52) U.S. Cl. .................... 323/285; 323/271; 323/275; 323/284; 323/286

(58) Field of Classification Search ............. 323/222, 323/271, 284, 286, 246, 247, 251–253, 266, 323/275, 238, 351; 307/130, 131
See application file for complete search history.

(56) References Cited

U.S. PATENT DOCUMENTS

| 6,683,441 B2 | 1/2004 | Schiff et al. |
| 7,078,884 B2 * | 7/2006 | Miura et al. ................. 323/272 |
| 7,230,406 B2 * | 6/2007 | Huang et al. ................. 323/222 |
| 7,471,133 B1 * | 12/2008 | Moussaoui et al. .......... 327/172 |

OTHER PUBLICATIONS

Analog Devices, "8-Bit Programmable 2- to 4-Phase Synchronous Buck Controller," Preliminary Technical Data ADP3192, Apr. 15, 2006, pp. 1-32.

* cited by examiner

*Primary Examiner*—Jessica Han
*Assistant Examiner*—Emily Pham
(74) *Attorney, Agent, or Firm*—Sidley Austin LLP

(57) ABSTRACT

According to an embodiment, in a DC/DC converter delivering current to load, a method is provided for rapidly responding to changes in load current. The method includes: detecting fast changes in load current; and when a fast change in load current is detected, providing non-linear control of the DC/DC converter.

23 Claims, 9 Drawing Sheets

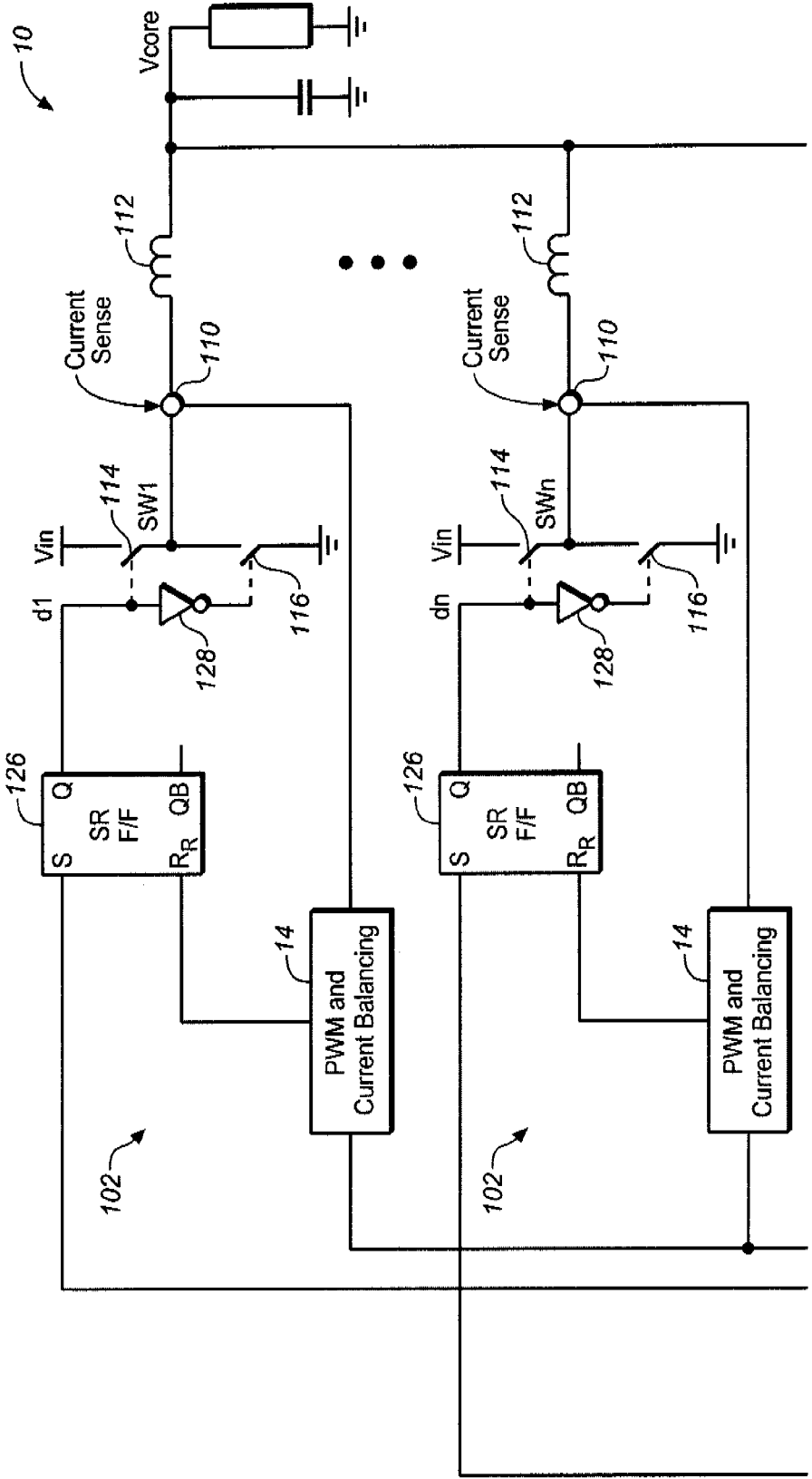

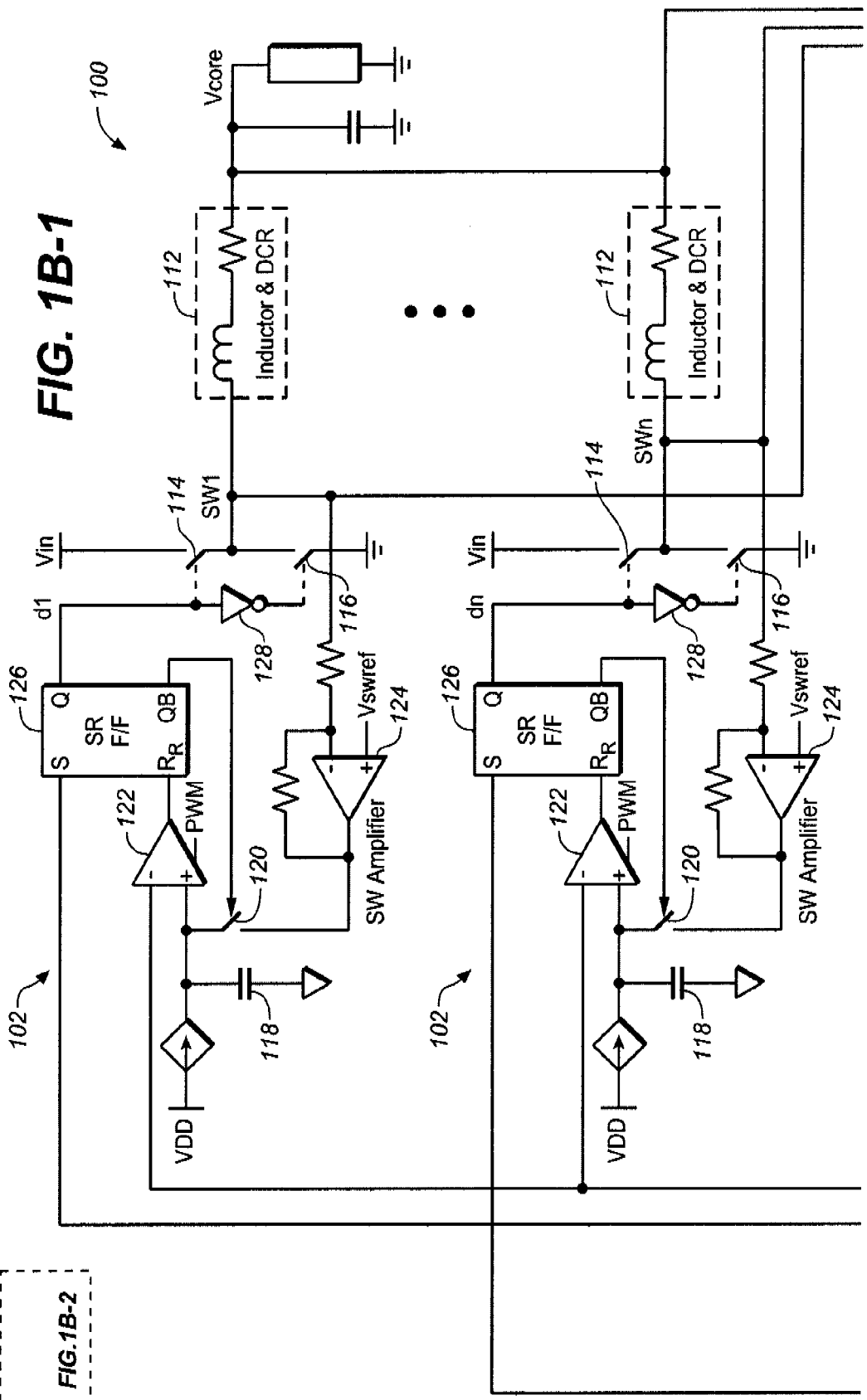

POWER CONVERTER ABLE TO RAPIDLY RESPOND TO FAST CHANGES IN LOAD CURRENT

TECHNICAL FIELD OF INVENTION

The present invention relates to power converters, and more particularly, to a power converter able to rapidly respond to fast changes in load current.

BACKGROUND

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Power converters may also include one or more capacitors or inductors.

In some applications for power converters, the load current may vary significantly (e.g., over several orders of magnitude). For example, in today's microprocessor applications, when switching out of "sleep" mode, processors may activate a large number of dormant circuits, which results in a large step-change in load current (e.g., 150 A) within a relatively short period of time (e.g., a few hundred nanoseconds). For such applications with a very high slew rate (such as 1000 A/μs), it is desirable for the power converter to be able to rapidly respond in order to provide proper regulation. Previously developed designs for power converters use linear control. Such power converters with linear control are not able to timely respond to fast changes in load current (large step-change in load).

SUMMARY

According to an embodiment of the present invention, in a DC/DC converter delivering current to load, a method is provided for rapidly responding to changes in load current. The method includes: detecting fast changes in load current; and when a fast change in load current is detected, providing non-linear control of the DC/DC converter.

According to another embodiment of the present invention, in a DC/DC converter delivering current to load, a system is provided for rapidly responding to changes in load current. The system includes circuitry operable to detect fast changes in load current and circuitry operable to provide non-linear control of the DC/DC converter when a fast change in load current is detected.

According to yet another embodiment of the present invention, in a power converter having a plurality of switches in a multi-phase arrangement and operable to be controlled by respective phase clock signals for delivering current to the load at an output terminal Vcore, a system is provided for rapidly responding to changes in load current. The system includes dynamic load current detection circuitry coupled to the output terminal Vcore for detecting fast changes in load current. Non-linear control circuitry is coupled to the dynamic load current detection circuitry. The non-linear control circuitry provides a one-shot pulse to overwrite the respective phase clock signal for at least one of the plurality of switches in response to the detection of a fast change in load current, thereby providing non-linear control of the power converter.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1A through 7 of the drawings. Like numerals are used for like and corresponding parts of the various drawings.

According to embodiments of the present invention, a power converter is provided which is able to rapidly respond to fast changes in load current. The power converter may dynamically detect load current and provide non-linear control.

More specifically, in some embodiments, the power converter implements a lossless, dynamic load current sensing scheme that can detect the AC portion of load current when there is a substantial change in the load current in a relatively short period of time (i.e., high di/dt load step changing), such as may occur when a device transitions from sleep mode to active mode. This sensing scheme is independent of the load operating point.

Non-linear control is implemented in the power converter using the fast current sensing technique, for example, to turn on one or more switches (e.g., MOSFETs) in a multi-phase arrangement in a controlled manner. Non-linear control blanking improves reliability of the transient response in the power converter at high toggle rates of load step-changing.

Figures 1, 1A, 2:
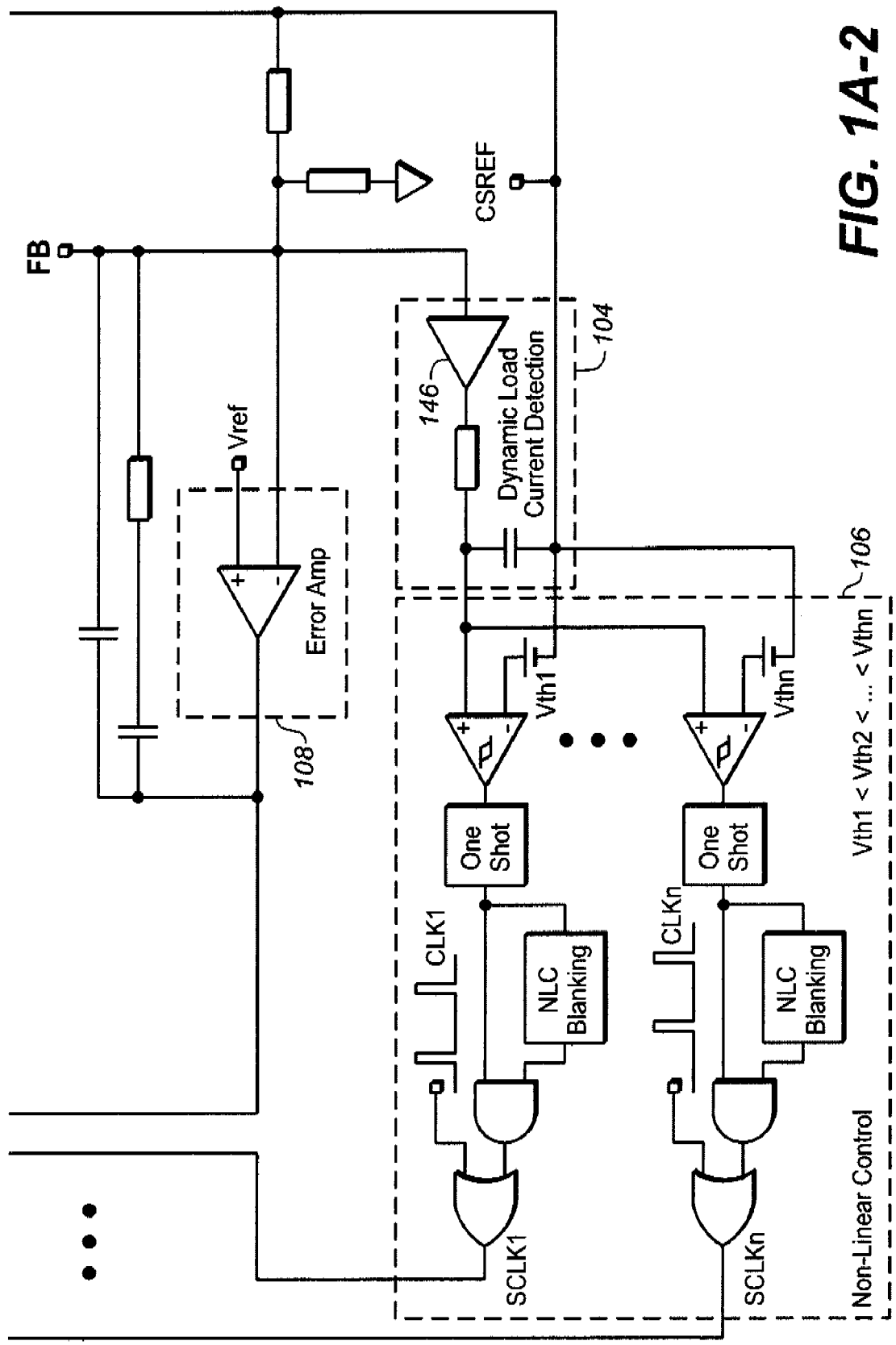
FIGS. 1A and 1B are schematic diagrams of exemplary implementations of a power converter system with dynamic load current detection and non-linear control, according to embodiments of the invention.
FIGS. 2 through 5 are exemplary waveform diagrams for a power converter system, according to an embodiment of the invention.

FIG. 1A is a schematic diagram in partial block form of an exemplary implementation of a power converter system 10 with dynamic load current detection and non-linear control, according to an embodiment of the invention. Power converter system 10 is a converter which can be incorporated in or used with an electronic device, such as, for example, a notebook computer or other application having a central processing unit. The power converter system 10 is a multi-phase converter, having phases 1 through n, and generating a plurality of phased output signals which are provided at respective switching nodes (SW1-SWn). Power converter system 10 can deliver power at low voltage (e.g., 1.2V) and high current (e.g., 150 A) to the load and an output capacitor at an output node Vcore, Power converter system 10 may employ droop compensation. Droop compensation intentionally decreases the dc output impedance of the power converter system, lowering its output voltage as load current increases.

The effect of droop compensation is to reduce overshoot or undershoot of the output voltage at Vcore during large step changes in load current, so that the power converter system can be implemented with a minimum amount of output capacitors, thereby providing a savings in cost. As shown, power converter 10 includes a plurality of phase output blocks 102, a dynamic load current detection block 104, a non-linear control block 106, an error amplifier block 108, and a current sensing block 110.

Power converter system 10 may also include or be coupled to one or more inductors 112. As used herein, the terms "coupled" or "connected," or any variant thereof, covers any coupling or connection, either direct or indirect, between two or more elements. Each inductor 112 has an inductance, and some amount of parasitic series resistance (DCR) (not shown). A separate inductor 112 is provided for each phase of the multi-phase converter. One end of each inductor 112 is connected to a respective phase output block 102 at the switching node (SW1-SWn); the other end of each inductor 112 is connected to the load at an output node (Vcore) for the converter 10. Each inductor 112 may carry an alternating current (AC) component and a DC component. The AC component of each inductor 112 ramps up and down during operation of the power converter 10; the DC component does not change for a given load.

The phase output blocks 102 provide or support phased output signals for power converter 10 at respective nodes SW1-SWn. Each phase output block 102 of power converter 10 comprises pulse width modulation (PWM) and phase current balancing circuitry 14 and gate drive circuitry for one or more switches 114, 116. As shown, for each phase output block 102, there are two switches connected as "high-side" and "low-side" in a half-bridge or "totem pole" arrangement. The high-side switch 114 is connected between input voltage Vin and the SW node, the low-side switch 116 is connected between the SW node and ground (GND). As shown, the switches 114 and 116 are implemented as MOSFETs. The gate driver circuitry provides drive signals to turn on and off the switches 114 and 116 to ramp up and down the current of the respective inductor 112, thereby delivering a static current to the load, charging and discharging the output capacitor and providing the output voltage at the node Vcore. The phase output blocks are responsive to control signals from the error amplifier block 108 and the non-linear control block 106. Each phase output block 102 is connected to receive a respective current sensing signal, a signal from the error amplifier block 108, and a respective signal from the non-linear control block 106.

The Rdson of the low-side switch 116 in each phase output block 102 may be used for phase current balancing, and DCR of inductor 112 may be used for active voltage positioning.

In power converter system 10, dynamically changing load current is rapidly detected and used to provide non-linear control for turning on one or more switches in the phase output blocks 102 in a controlled manner. This is accomplished with the dynamic load current detection block 104 and the non-linear control block 106.

The dynamic load current detection block 104 and non-linear control block 106 utilize or takes into account the voltage difference between a reference (CSREF) node (which has the same voltage as the output node Vcore) and a feedback (FB) node. From an AC perspective, the voltage differential between the CSREF node and the FB node will vary, but at steady state, the voltages at CSREF and FB are the same. This is due to the di/dt slew rate limitation of inductors 112. In particular, the voltage at the CSREF node represents or is indicative of the total load current during approximately the initial time (typically, in the first µs) after the load step-up changing by utilizing the capacitor's equivalent series resistance (ESR) and equivalent series inductance (ESL) as the load current sensing element. The voltage at the FB node represents or is indicative of the total inductor current. The voltage at the FB node will not change as fast as the voltage at the CSREF (or output) node (typically, slower by a few orders of magnitude) since the current flow in the inductors 112 does not change instantaneously. It can be approximated that the voltage at the FB node does not change at all during the first µs. Thus, the difference in voltage between the FB node and the CSREF node represents the dynamic load current information of a step-up change in load current on the power converter system 10 during, for example, the initial first µs. This sensed dynamic load current information can be used for the non-linear control of the power converter system 10. In non-linear control, the dynamic load current information is only of concern during a very short period of time after the load step-up changing (such as, within approximately the first µs). After this initial period (in which non-linear control is used), the dynamic load current information is not as much of a concern, since the linear control loop of the converter system starts to respond and handles the output regulation.

Dynamic load current detection block 104 is coupled to the FB node and the CSREF (output) node. Dynamic load current detection block 104 provides for rapid detection of step-changes in the load current. As shown, dynamic load current detection block 104 includes a buffer 146 and an RC network. The RC network functions as a filter to eliminate noise in the incoming FB and CSREF signals, thus obtaining reliable AC current information for the dynamically changing load.

Non-linear control block 106 is coupled to and receives one or more output signals from the dynamic load current detection block 104. Once the AC current has been rapidly sensed by dynamic load current detection block 104, non-linear control block 106 implements non-linear control to reduce the effect of the AC current at the output. This is explained in more detail with reference to FIGS. 6 and 7 below. As shown, non-linear control block 106 includes one or more comparators 150, one shot circuits 152, non-linear control (NLC) blanking circuits 154, AND gates 156, and OR gates 158. In this implementation, a separate comparator 150, one shot circuit 152, blanking circuit 154, AND gate 156, and OR gate 158 is provided for each phase of the multiphase power converter system 10. The non-linear control block 106 outputs one or more signals, which can be provided to respective phase output blocks 102.

Figures 1, 1B, 2:
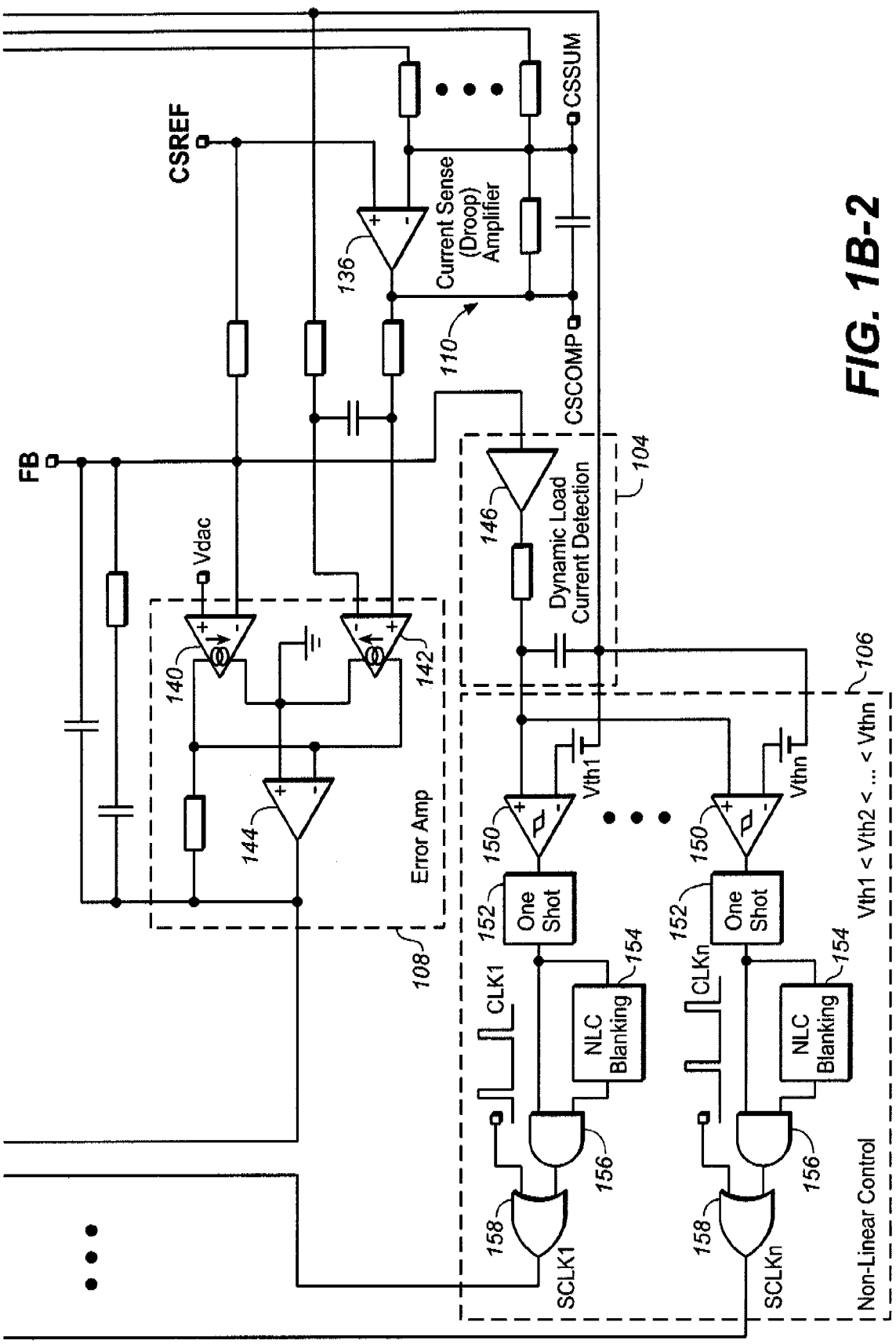
Figure 2:
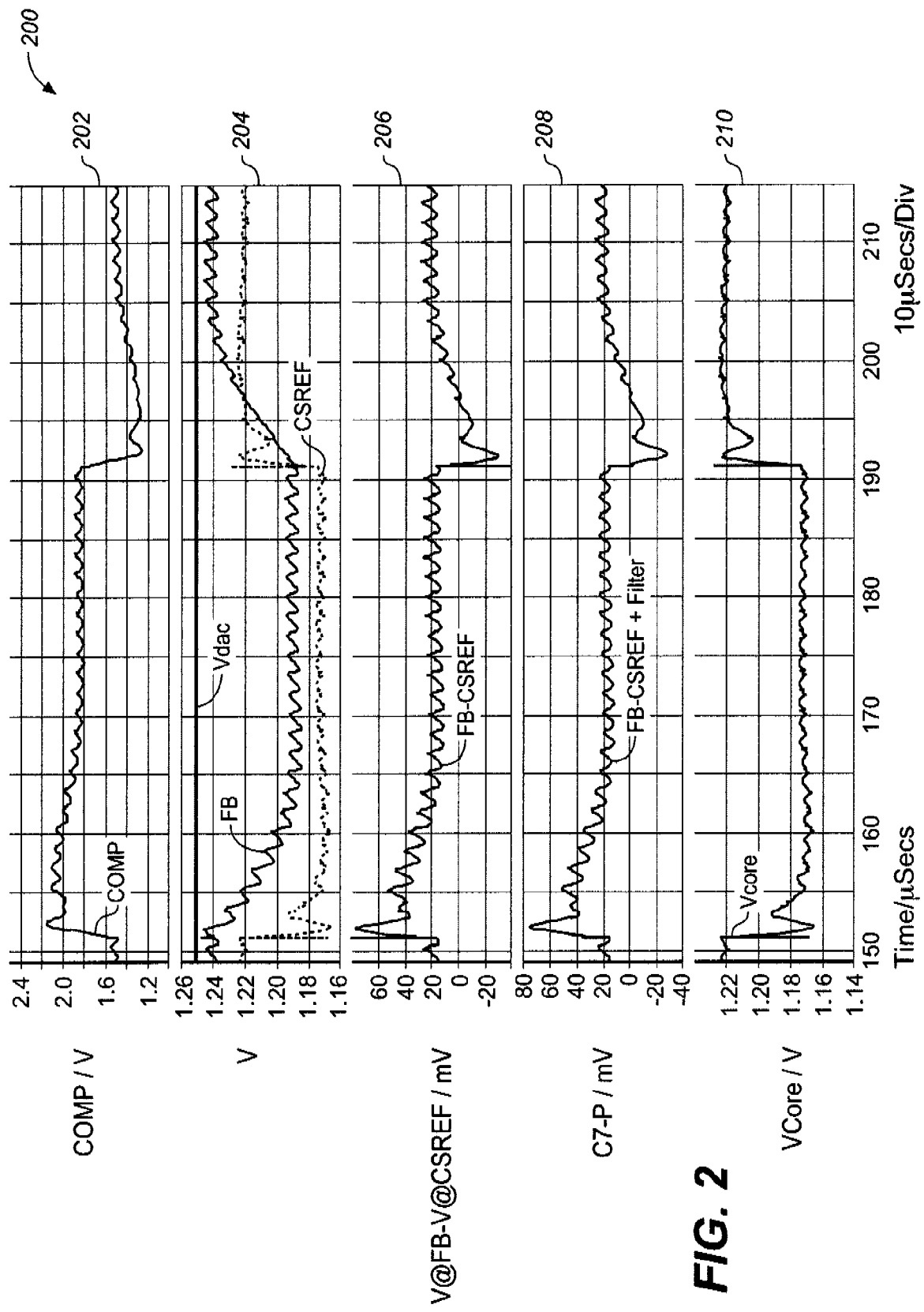

FIG. 1B is a schematic diagram in partial block form of another exemplary implementation of a power converter system 100 with dynamic load current detection and non-linear control, according to an embodiment of the invention. Power converter system 100 shown in FIG. 1B is similar to power converter system 10 shown in FIG. 1A, and as such, includes the plurality of phase output blocks 102, dynamic load current detection block 104, non-linear control block 106, and error amplifier block 108.

The phase output blocks 102 provide or support phased output signals for power converter 100 at respective nodes SW1-SWn. Each phase output block 102 of power converter 100 comprises pulse width modulation (PWM) and phase current balancing 14 and gate drive circuitry for one or more switches 114, 116. As shown, the phase output block 102 includes a capacitor 118, a switch 120, a pulse width modulation (PWM) comparator 122, a switch (SW) amplifier 124, a latch 126, and an inverter 128. The phase output blocks are responsive to control signals from the error amplifier block 108 and the non-linear control block 106. Each phase output block 102 is connected to receive a signal from the respective SW amplifier 124, the error amplifier block 108, and a respective signal from the non-linear control block 106. Inductors 112 are connected to phase output blocks 102. In FIG. 1B, the parasitic series resistance (DCR) of each inductor 112 is expressly shown.

Power converter system 100 also includes a current sensing block 110. The current sensing block 110 generates a signal which represents the total current flowing across the inductors 112. As shown, in one embodiment, the current sensing block 110 comprises a current sense amplifier 136, which can be implemented as an operational amplifier. The current sense amplifier 136 uses the drop in voltage across the DCRs of inductors 112 to sense the load current. To accomplish this, the inverting (−) terminal of the current sense amplifier 136 is connected to one end of each of the inductors 112 at respective the switching nodes (SW1-SWn). The inverting (−) terminal functions as a summing node for these switching nodes. The non-inverting (+) terminal of the current sense amplifier 136 is connected to the other end of each of the inductors 112 at the output node (also the CSREF node) at which the load voltage appears. An RC network, which is coupled between the inverting (−) terminal of the current sense amplifier 136 and its output terminal, provides inductor time constant matching which allows for measuring current across the inductors 112. The output of the current sense amplifier 136 represents the total current flowing through the inductors 112.

In this implementation, the error amplifier block 108 is coupled to the current sensing block 110 and receives the output signal therefrom. The error amplifier block 108 may be part of a linear compensation network and generates a signal which is provided to each phase output block 102. As depicted, in one embodiment, the error amplifier block 108 comprises transconductance (GM) amplifiers 140, 142, and an operational amplifier 144. The transconductance amplifiers 140, 142 may be substantially identical or matched. Transconductance amplifier 140 has one input terminal coupled to the feedback (FB) node and another input terminal for receiving a Vdac reference voltage. Transconductance amplifier 142 has one input terminal which is coupled the CSREF node and another input terminal for receiving the output of the current sensing block 110. Transconductance amplifier 142 allows for programming of droop compensation. Each transconductance amplifier 140, 142 provides an output current signal. The inverting (−) terminal of the operational amplifier 144 is connected to receive one of these two output signals from each of the transconductance amplifiers 140, 142. The non-inverting (+) terminal of the operational amplifier 144 is connected to receive the other of the signals from each of the amplifiers 140, 142. The operational amplifier 144 generates an output signal (COMP), which is the output of the error amplifier block 108. The COMP signal is provided to the PWM comparator 122 of each phase output block 102 for adjusting duty cycle.

In various embodiments, all or a portion of power converter systems 10 and 100 shown in FIGS. 1A and 1B can be implemented on a single or multiple semiconductor dies (commonly referred to as a "chip") or discrete components. Each die is a monolithic structure formed from, for example, silicon or other suitable material. For implementations using multiple dies or components, the packaged dies or integrated circuits (ICs) and components can be assembled on a printed circuit board (PCB) having various traces for conveying signals therebetween. For example, in one embodiment, all or a portion of phase output blocks 102, dynamic load current detection block 104, non-linear control block 106, error amplifier block 108, current sensing block 110 are provided on one IC and inverters 128 (for gate drive) are provided on another IC.

The operation of the implementations of power converter system 10 or 100 with dynamic load current detection and non-linear control can be understood with further reference to FIGS. 2 through 5, which are exemplary waveform diagrams for the system, according to an embodiment of the invention.

Referring to FIG. 2, a waveform diagram 200 has waveforms 202, 204, 206, 208, and 210. Waveform 202 represents the output (COMP) of the error amplifier block 108. Waveform 204 depicts the reference voltage (Vdac) which is provided to error amplifier block 108, and the feedback (FB) voltage and CSREF (output) voltages which are provided to dynamic load current detection block 104 and non-linear control block 106. There is a difference between the FB voltage (which is indicative of the total inductor current) and the CSREF voltage (which is indicative of the total load current sensed by the capacitor's ESR and ESL during the brief, initial period of time (e.g., approximately, the first µs)). Waveform 206 is essentially the result of the FB voltage minus the CSREF voltage, and represents the AC component of load current (e.g., step-change in load current on the power converter system 10 or 100). Dynamic load current detection block 104 rapidly detects this step change (by taking the difference between the two voltages and filtering). Waveform 208 is the output from the dynamic load current detection block 104, and represents the result of FB voltage minus CSREF voltage after filtering. Non-linear control block 106 of power converter system 10 or 100 uses the output from dynamic load current detection block 104 for non-linear control of the power converter system 10 or 100. Waveform 210 represents the output voltage Vcore, which can be the same as the CSREF voltage. As shown, the period for waveform diagram 200 is from about time 150 µs to time 215 µs. As can been seen from FIG. 2, the sensed dynamic load current information is useful for non-linear control only within approximately, the first µs in this example (approximately in the range of time 151-152 µs); after that, the sensed dynamic load current is not as useful or helpful, since linear control can be used.

Figure 3:
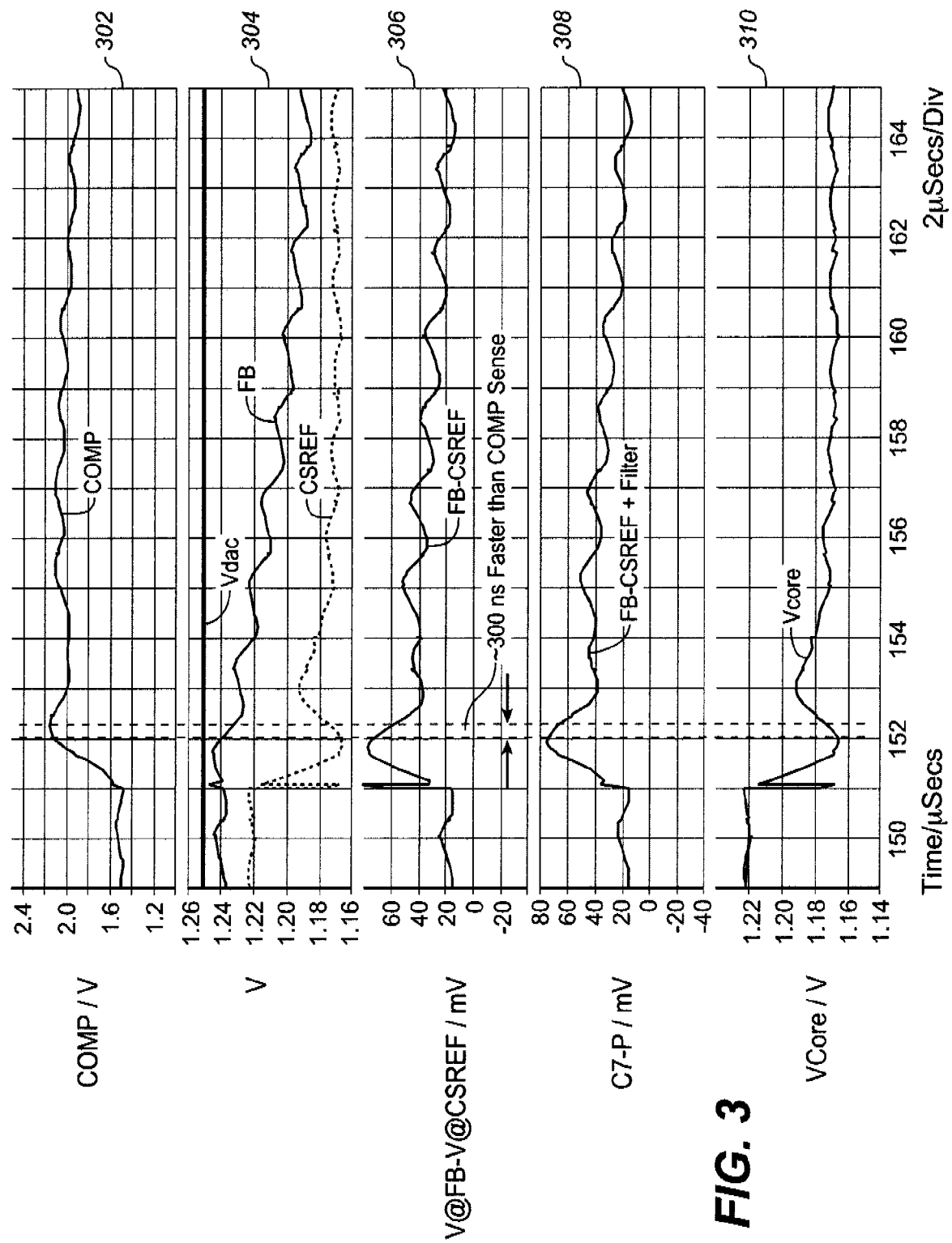

FIG. 3 is a waveform diagram 300 which provides an expanded view of the various waveforms of FIG. 2 in a particular period when there is a step-up change in load current on the power converter system 10 or 100. More specifically, waveform diagram 300 has waveforms 302, 304, 306, 308, and 310, which correspond to waveforms 202, 204, 206, 208, and 210 of diagram 200 during the period from about time 150 µs to time 165 µs. Waveform diagram 300 of FIG. 3 more clearly illustrates the difference between the FB voltage and the CSREF voltage (representing the dynamic load current information sensed with the capacitor's ESR and ESL) during a step-up change. FIG. 3 also shows the rapid detection of a step-up change by dynamic load current detection block 104 using the FB and CSREF voltages (approximately in the range of time 151-152 µs), as compared to the response (COMP) from error amplifier block 108. For example, as seen in FIG. 3, the detection of a load step-up change using the difference between FB and CSREF voltages may be approximately 300 ns faster than using COMP as the approximate dynamic load current detection in this example. Furthermore, the waveform 302 for the COMP voltage shows the unpredictability of the DC operation point. The waveform 306 for the difference between FB and CSREF voltages shows that the current detection in power converter system 10 or 100 can be independent of the DC operation point, and is therefore more reliable.

Figure 4:
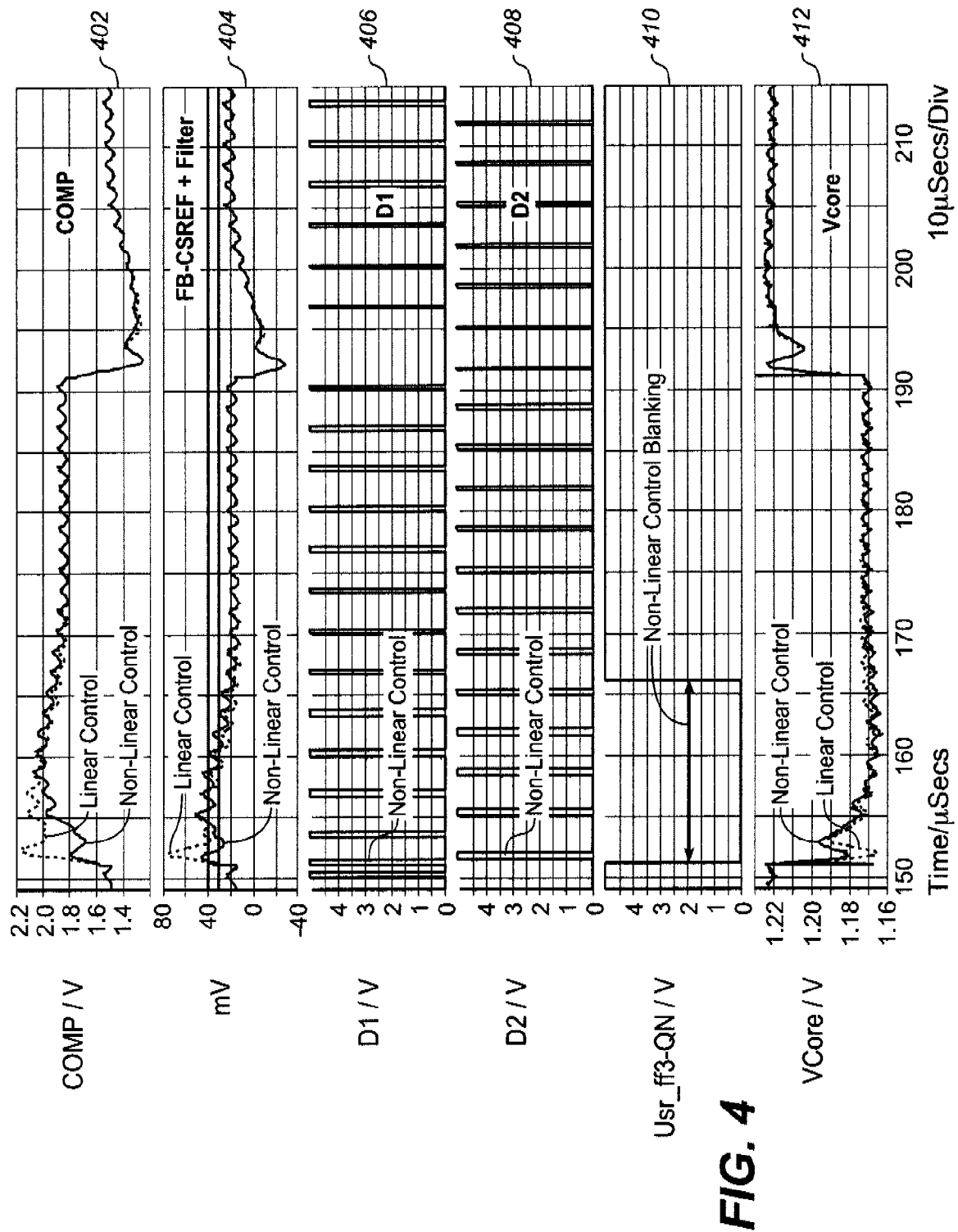

Referring to FIG. 4, a waveform diagram 400 illustrates the control of power converter system 10 or 100 during operation. As shown, the control of power converter system 10 or 100 may be essentially linear at some points in time and non-linear at others. Waveform diagram 400 has waveforms 402, 404, 406, 408, 410, and 412. As shown, the period for waveform diagram 400 is from about time 150 μs to time 215 μs.

Non-linear control is used in power converter system 10 or 100 when there is a large step-up change in load current, such as may occur when a device transitions from sleep mode to active mode. As described herein, the rapid detection of a step-up change is accomplished by dynamic load current detection block 104 using the FB and CSREF voltages. After the step-up change in load current has been detected, non-linear control block 106 provides non-linear control of the power converter system 10 or 100. In general, non-linear control block 106 outputs one or more signals for causing phase output blocks 102 to adjust the current in inductors 112 quickly, which lowers the second undershoot (which can occur within approximately the first us after the load step-up change) of the transient response in the power converter system 10 or 100. Note that the first undershoot, which is very narrow as shown in waveform 412 of FIG. 4, is due to dynamic load current flowing through the ceramic capacitors at the output, and the second undershoot is due to dynamic current flowing through the bulk capacitors. One purpose of non-linear control is to lower or reduce the second undershoot, which can save the bulk capacitors and thus lower the implementation cost of the converter. Due to bandwidth limitation, conventional linear control is not able to achieve this.

With reference to FIGS. 1 and 4, non-linear control block 106 receives the output from dynamic load current detection block 104. This is represented by in the waveform 404, which is the filtered difference between the FB and CSREF voltages (for detecting fast step-up changes in load current). When a load step-up change is detected, which is higher than the first non-linear control reference voltage Vth1, the non-linear control block 106 generates a one shot to overwrite the phase 1 clock signal CLK1, thus turning on the phase 1 high-side switch 114 through the phase 1 latch 126. Meanwhile, a non-linear control blanking interval is created for phase 1, as represented in waveform 410. During the non-linear control blanking interval, the non-linear control block 106 is temporarily disabled in order to get eliminate or reduce noise effect and improve the reliability of non-linear control. When this load step-up change is higher than the second non-linear control reference voltage Vth2, the non-linear control block 106 generates a one shot to overwrite the phase 2 clock signal CLK2, thus turning on the phase 2 high-side switch 114 through phase 2 latch 126. Meanwhile, a non-linear control blanking interval is created for phase 2. This process will continue until either the non-linear control circuit 106 turns on the high-side switches 114 for all phases, or the sensed dynamic load current is lower than Vthk (in which case, the non-linear control circuit will turn the high-side switch 114 of phases 1 through k−1, but does not turn on the switch 114 of phase k). This non-linear control puts some or all of the inductors 112 in parallel, which gives an equivalent inductance that is smaller than any inductor 112 taken individually. With the smaller equivalent inductance, there will be a faster slew rate for the inductor current (i.e., higher di/dt). As seen in waveform 412, the non-linear control provides better transient response in the power converter system 10 or 100 than linear control.

Figure 5:
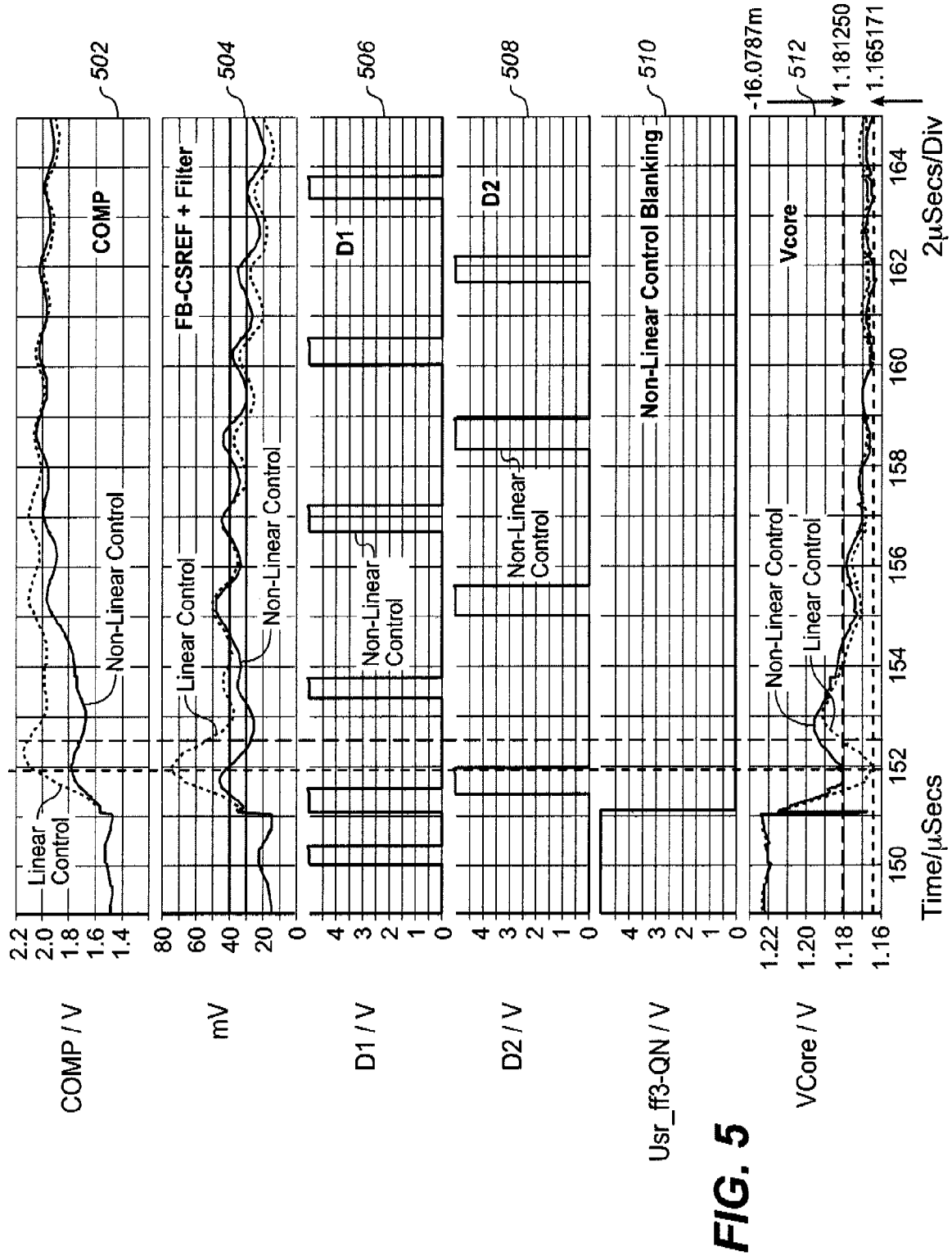

FIG. 5 is a waveform diagram 500 which provides an expanded view of the various waveforms of FIG. 4 in a particular period when there is a step-up change in load current on the power converter system 10 or 100. More specifically, waveform diagram 500 has waveforms 502, 504, 506, 508, 510, and 512 which correspond to waveforms 402, 404, 406, 408, 410, and 412 of diagram 400 during the period from about time 150 μs to time 165 μs. Waveform diagram 500 of FIG. 5 more clearly illustrates the improved response provided by non-linear control during a step-up load change in power converter system 10 or 100. This is seen in waveform 512, which shows that non-linear control provides an improvement (approximately 16.1 mV) on the second undershoot of the output voltage Vcore in this example, which occurs at approximately time 152 μs. Furthermore, with the implementation of the non-linear control blanking, power converter system 10 or 100 achieves high reliability at high toggle rate load transient. Waveform 510 illustrates non-linear control blanking for phase 1 as shown in waveform 506.

Figure 6:
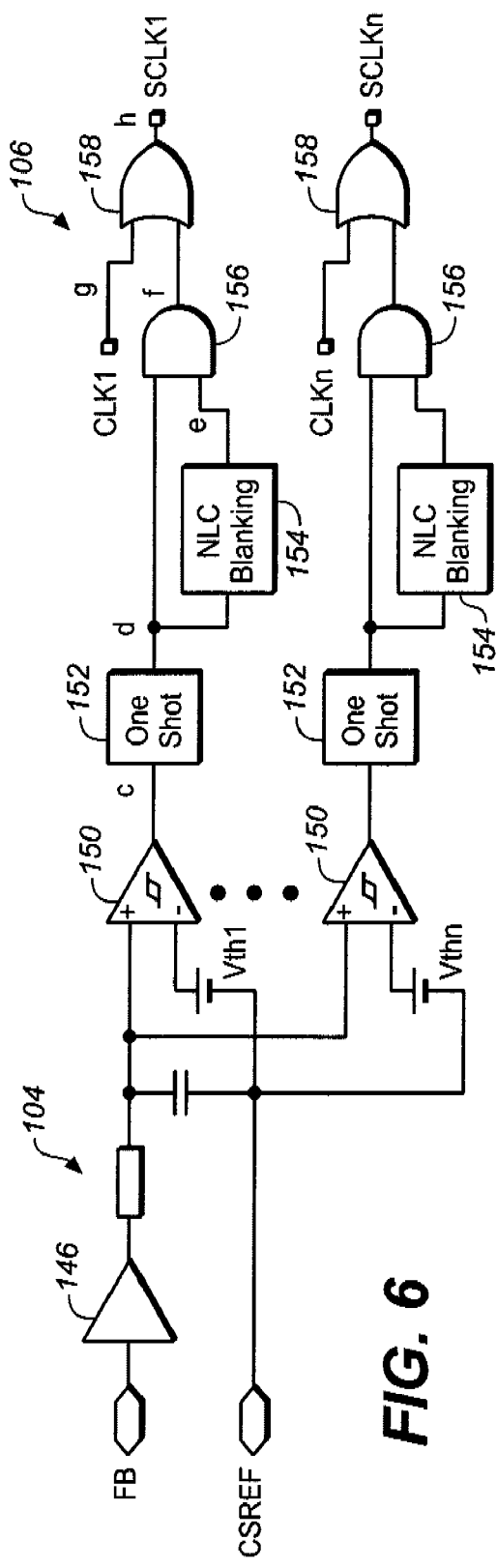
FIG. 6 is a schematic diagram in partial block form of an exemplary implementation for a dynamic load current detection block and a non-linear control block, according to an embodiment of the invention, with various nodes labeled.

FIG. 6 is a schematic diagram in partial block form of an exemplary implementation for a dynamic load current detection block 104 and a non-linear control block 106, according to an embodiment of the invention, with various nodes labeled. As shown, dynamic load current detection block 104 includes buffer 146 and an RC network. Non-linear control block 106 includes, for each phase of the multi-phase converter, comparator 150, one shot circuit 152, non-linear control (NLC) blanking circuit 154, AND gate 156, and OR gate 158.

With respect to the circuitry for one exemplary phase, the output of comparator 150 is provided at a node c. The output of one shot circuit 152 is provided at a node d. The output of NLC blanking circuit 154 is provided at a node e. The output of AND gate 156 is provided at a node f. A phase 1 clock signal (CLK1) is provided at a node g. The output of OR gate 158 is provided at a node h, which is the output signal SCLK1 for the respective phase.

Figure 7:
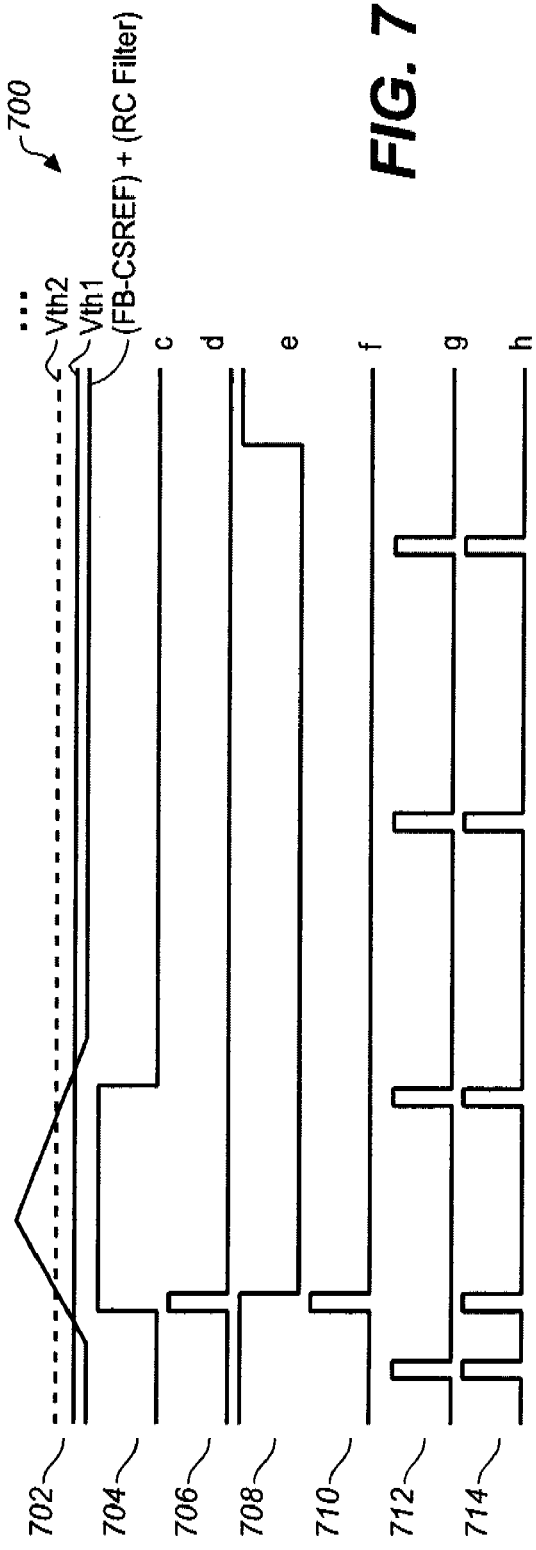
FIG. 7 is an exemplary waveform diagram for the non-linear control block, according to an embodiment of the invention.

FIG. 7 is an exemplary waveform diagram 700 for phase 1 of the non-linear control block 106, according to an embodiment of the invention. Waveform diagram 700 has waveforms 702, 704, 706, 708, 710, 712, and 714. Waveform 702 corresponds to the signal voltages for the inputs at n comparators 150. The remaining waveforms 704, 706, 708, 710, 712, and 714 correspond to the signal voltages at nodes c, d, e, f, g, and h of phase 1 in non-linear control block 106 as shown in FIG. 6.

Referring to FIGS. 6 and 7, dynamic load current detection block 104 provides the filtered difference between the FB and CSREF voltages (for detecting fast step-changes in load current) to the comparators 150 of non-linear control block 106. A respective voltage source at the non-inverting (−) terminal of each comparator 150 provides a threshold (Vth1, . . . , Vthn) for comparison. Each comparator 150 compares the output from the load current detection block 104 against the respective threshold. When the filtered voltage difference between FB and CSREF exceeds the threshold Vth1 as seen in waveform 702, the comparator 150 provides a logic high signal in its output signal at node c, as seen in waveform 704. This causes the one shot circuit 152 to output a pulse at node d, as seen in waveform 706. The pulse from one shot circuit 152 causes the NLC blanking circuit 154 to generate an NLC blanking interval at node e, as seen in waveform 708. AND gate 156 performs an "AND" operation between the voltage signals at nodes d and e, which results in a pulse at node f, as seen in waveform 710. The clock signal CLK1 comprises a series of pulses at switching frequency at node g, as seen in waveform 712. The OR gate 158 performs an "OR" operation between the voltage signals at nodes f and g, to provide the output signal from non-linear control block 106, as seen in waveform 714. This output signal from non-linear control block 106 essentially adds a pulse to the original phase clock signal CLK1 when a step-up change in load current is detected.

Thus, in various embodiments, systems and methods are provided for implementing techniques for dynamically detecting load current and providing non-linear control in a power converter.

In some embodiments, the fast dynamic current sense technique uses the difference between the FB pin and the CSREF (output) pin to detect fast change in the load current in a power converter system. By doing so, the DC load current information can be cancelled out at steady state. Hence, the technique is independent of the various operating conditions of the power converter system. The dynamic current sensing technique is faster than previously developed techniques, since the proposed sensing technique eliminates control bandwidth and high frequency compensator pole effects. Using this fast dynamic current sensing scheme enables non-linear control in the power converter system. Thus, individual switches (e.g., MOSFETs) in a phased converter can be turned on one by one, thereby achieving fast transient response. As a result, embodiments of the present invention provide savings in the number of output bulk capacitors, the total BOM cost, and printed circuit board (PCB) space for a power converter system implementation.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. In a DC/DC converter delivering current to a load, the DC/DC converter having a plurality of inductors for which current is ramped up and down in phases to deliver power to the load, wherein the DC/DC converter comprises a plurality of switches in a multi-phase arrangement and operable to be controlled for delivering current to the load, a method for rapidly responding to changes in load current, the method comprising:
   providing linear control of the DC/DC converter;
   detecting fast changes in load current by comparing a signal indicative of the load current against a signal indicative of total current flowing through the plurality of inductors; and
   when the fast change in load current is detected, providing non-linear control of the DC/DC converter;
   wherein providing non-linear control comprises providing a one-shot pulse to overwrite a phase clock signal for at least one of the plurality of switches.

2. The method of claim 1, wherein detecting fast changes in load current comprises detecting an AC portion of load current when there is a substantial change in the load current.

3. The method of claim 1, wherein detecting fast changes in load current comprises sensing the voltage difference between a FB node and a CSREF node.

4. The method of claim 3, wherein the CSREF node has the same voltage value as an output node for the DC/DC converter.

5. In a DC/DC converter delivering current to a load, the DC/DC converter having a plurality of inductors for which current is ramped up and down in phases to deliver power to the load, wherein the DC/DC converter is operable to be used with an electronic device, a method for rapidly responding to changes in load current, the method comprising:
   providing linear control of the DC/DC converter;
   detecting fast changes in load current by comparing a signal indicative of the load current against a signal indicative of total current flowing through the plurality of inductors, wherein the fast changes in load current are related to a large step-change in load current corresponding to when the electronic device transitions from a sleep mode to an active mode; and
   when the fast change in load current is detected, providing non-linear control of the DC/DC converter.

6. The method of claim 5, wherein the DC/DC converter comprises a plurality of switches in a multi-phase arrangement and operable to be controlled for delivering current to the load, wherein providing non-linear control comprises turning on one or more of the plurality of switches in a controlled manner.

7. The method of claim 5, wherein providing non-linear control comprises comparing a voltage indicative of the change in load current against at least one reference voltage.

8. In a DC/DC converter delivering current to a load, the DC/DC converter having a plurality of inductors for which current is ramped up and down in phases to deliver power to the load, a method for rapidly responding to changes in load current, the method comprising:
   providing linear control of the DC/DC converter;
   detecting fast changes in load current by comparing a signal indicative of the load current against a signal indicative of total current flowing through the plurality of inductors;
   when the fast change in load current is detected, providing non-linear control of the DC/DC converter; and
   reducing at least one undershoot of a voltage at an output node for the DC/DC converter.

9. In a DC/DC converter delivering current to a load, the DC/DC converter having a plurality of inductors for which current is ramped up and down in phases to deliver power to the load, wherein the DC/DC converter comprises a plurality of switches in a multi-phase arrangement and operable to be controlled for delivering current to the load, a system for rapidly responding to changes in load current, the system comprising:
   circuitry operable to provide linear control of the DC/DC converter;
   circuitry operable to detect fast changes in load current by comparing a signal indicative of the load current against a signal indicative of total current flowing through the plurality of inductors; and
   circuitry operable to provide non-linear control of the DC/DC converter when the fast change in load current is detected;
   wherein the circuitry operable to provide non-linear control comprises circuitry operable to provide a one-shot pulse to overwrite a phase clock signal for at least one of the plurality of switches.

10. The system of claim 9, wherein the circuitry operable to detect fast changes is coupled to a FB node and a CSREF node and comprises circuitry operable sensing the voltage difference between the FB node and the CSREF node.

11. The system of claim 9, wherein the circuitry operable to detect fast changes comprises circuitry operable to detecting an AC portion of load current when there is a substantial change in the load current.

12. The system of claim 10, wherein the CSREF node has the same voltage value as an output node for the DC/DC converter.

13. In a DC/DC converter delivering current to a load, the DC/DC converter having a plurality of inductors for which current is ramped up and down in phases to deliver power to the load, wherein the DC/DC converter comprises a plurality of switches in a multi-phase arrangement and operable to be controlled for delivering current to the load, a system for rapidly responding to changes in load current, the system comprising:
  circuitry operable to provide linear control of the DC/DC converter;
  circuitry operable to detect fast changes in load current by comparing a signal indicative of the load current against a signal indicative of total current flowing through the plurality of inductors; and
  circuitry operable to provide non-linear control of the DC/DC converter when the fast change in load current is detected;
  wherein the circuitry operable to provide non-linear control is operable to compare a voltage indicative of the change in load current against n reference voltages and, if the voltage indicative of the change in load current is higher than k ($1 \leq k \leq n$) reference voltages, to provide a one-shot pulse to overwrite k phase clock signals for k of the plurality of switches.

14. In a DC/DC converter delivering current to a load, the DC/DC converter having a plurality of inductors for which current is ramped up and down in phases to deliver power to the load, wherein the DC/DC converter is operable to be used with an electronic device, a system for rapidly responding to changes in load current, the system comprising:
  circuitry operable to provide linear control of the DC/DC converter;
  circuitry operable to detect fast changes in load current by comparing a signal indicative of the load current against a signal indicative of total current flowing through the plurality of inductors, wherein the fast changes in load current are related to a large step-change in load current corresponding to when the electronic device transitions from a sleep mode to an active mode; and
  circuitry operable to provide non-linear control of the DC/DC converter when the fast change in load current is detected.

15. The system of claim 14, wherein the DC/DC converter comprises a plurality of switches in a multi-phase arrangement and operable to be controlled for delivering current to the load, wherein the circuitry operable to provide non-linear control comprises circuitry operable to turn on one or more of the plurality of switches in a controlled manner.

16. In a DC/DC converter delivering current to a load, the DC/DC converter having a plurality of inductors for which current is ramped up and down in phases to deliver power to the load, a system for rapidly responding to changes in load current, the system comprising:
  circuitry operable to provide linear control of the DC/DC converter;
  circuitry operable to detect fast changes in load current by comparing a signal indicative of the load current against a signal indicative of total current flowing, through the plurality of inductors;
  circuitry operable to provide non-linear control of the DC/DC converter when the fast change in load current is detected; and
  circuitry operable to reduce at least one undershoot of a voltage at an output node for the DC/DC converter.

17. In a power converter having a plurality of switches and a plurality of inductors in a multi-phase arrangement, wherein the plurality of switches are operable to be controlled by respective phase clock signals for causing current to be ramped up and down in the plurality of inductors for delivering current to a load at an output terminal Vcore, a system for rapidly responding to changes in load current, the system comprising:
  dynamic load current detection circuitry coupled to the output terminal Vcore for detecting fast changes in load current, the dynamic load current detection circuitry operable to compare a signal indicative of the load current against a signal indicative of total current flowing through the plurality of inductors; and
  non-linear control circuitry coupled to the dynamic load current detection circuitry for providing a one-shot pulse to overwrite the respective phase clock signal for at least one of the plurality of switches in response to the detection of a fast change in load current, thereby providing non-linear control of the power converter.

18. The system of claim 17, wherein the non-linear control circuitry is operable to compare a voltage indicative of the change in load current against n reference voltages and, if the voltage indicative of the change in load current is higher than k ($1 \leq k \leq n$) reference voltages, to provide k one-shot pulses.

19. The system of claim 17, wherein the power converter is operable to be used with an electronic device, wherein fast changes in load current are related to a large step-change in load current corresponding to when the electronic device transitions from a sleep mode to an active mode.

20. The system of claim 17, wherein the dynamic load current detection circuitry is operable to detecting an AC portion of load current when there is a substantial change in the load current.

21. The system of claim 17, wherein the dynamic load current detection circuitry is operable to sense the voltage difference between a feedback signal and the output of the power converter, wherein such voltage difference is indicative of a dynamic load current in the power converter.

22. The system of claim 17, wherein the power converter comprises a plurality of inductors, each inductor coupled to a respective one of the plurality of switches.

23. The system of claim 17, wherein the power converter comprises drive circuitry coupled to each of the switches, wherein the non-linear control circuitry is coupled to and provides the one-shot pulse to the drive circuitry.

* * * * *